United States Patent [19]

Eveland

[11] Patent Number: 5,504,301
[45] Date of Patent: Apr. 2, 1996

[54] APPARATUS AND METHOD FOR LASER ENGRAVING THIN SHEET-LIKE MATERIALS

[75] Inventor: James A. Eveland, San Francisco, Calif.

[73] Assignee: Laser Cut Images International, Inc., Sonoma, Calif.

[21] Appl. No.: 215,153

[22] Filed: Mar. 21, 1994

[51] Int. Cl.⁶ .................................................. B23K 26/00
[52] U.S. Cl. ........................... 219/121.67; 219/121.68; 219/121.84
[58] Field of Search ................ 219/121.67, 121.68, 219/121.69, 121.84, 121.86, 121.73, 121.75, 121.6

[56] References Cited

U.S. PATENT DOCUMENTS

| | | | |
|---|---|---|---|
| 3,626,141 | 12/1971 | Daly | 219/121.68 |
| 3,668,028 | 6/1972 | Short | 219/121.69 |
| 3,866,398 | 2/1975 | Vernon, Jr. et al. | 219/121.69 |
| 4,156,124 | 5/1979 | Macken et al. | 219/121.68 |
| 4,430,548 | 2/1984 | Macken | 219/121.67 |
| 4,458,133 | 7/1984 | Macken | 219/121.67 |
| 4,467,168 | 8/1984 | Morgan et al. | 219/121.67 |
| 4,480,169 | 10/1984 | Macken | 219/121.68 |
| 4,639,572 | 1/1987 | Gruzman et al. | 219/121.67 |
| 4,642,445 | 2/1987 | Stol | 219/121.84 |
| 4,856,513 | 8/1989 | Muller | 219/121.6 |
| 4,942,284 | 7/1990 | Etcheparre et al. | 219/121.67 |
| 5,227,606 | 7/1993 | Weeks et al. | 219/121.67 |
| 5,359,176 | 10/1994 | Balliet, Jr. et al. | 219/121.67 |

FOREIGN PATENT DOCUMENTS

| | | | |
|---|---|---|---|
| 63-224894 | 9/1988 | Japan | 219/121.84 |
| 2-290689 | 11/1990 | Japan | |

*Primary Examiner*—Geoffrey S. Evans
*Attorney, Agent, or Firm*—Flehr, Hohbach, Test, Albritton & Herbert

[57] ABSTRACT

A laser engraving apparatus (10) and method for engraving a workpiece (15) which includes a mask (11) having at least one image opening (14) extending therethrough. A suction housing (21) is operably coupled to a source of partial vacuum (19) and includes a mouth portion (22) positioned proximate the mask (11) to hold the workpiece (15) and the mask (11) in abutting contact, A laser cutting assembly (24) generates a laser beam (26) which is directed onto the exposed surface (16) under the mask (11) causing engraving thereof. Vaporization or engraving by-products are drawn away from the vaporization surface (16) through the partial vacuum used to hold the mask (11) and workpiece (15) together, The partial vacuum also may be used to cool the mask (11).

21 Claims, 1 Drawing Sheet

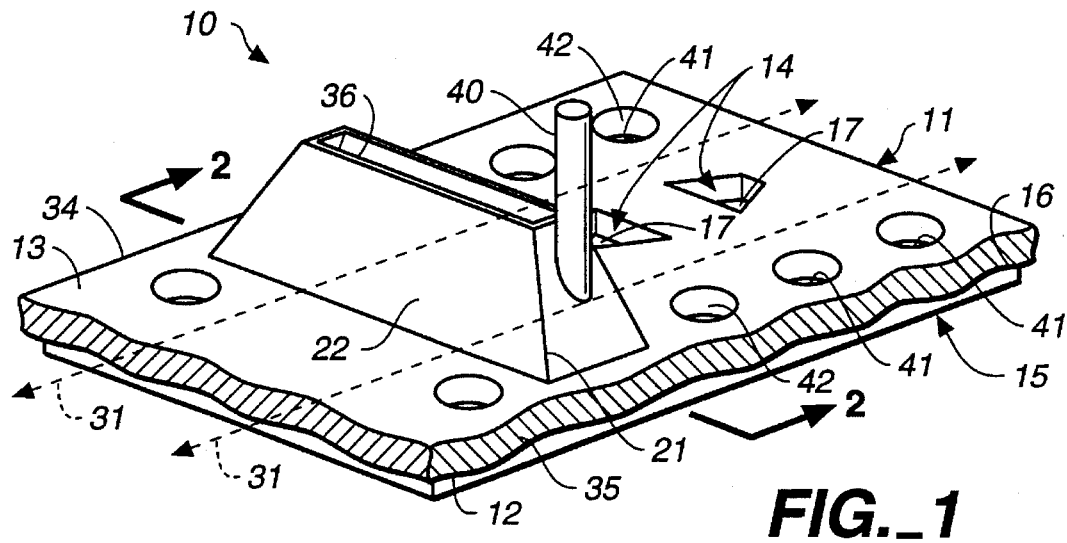
FIG._1
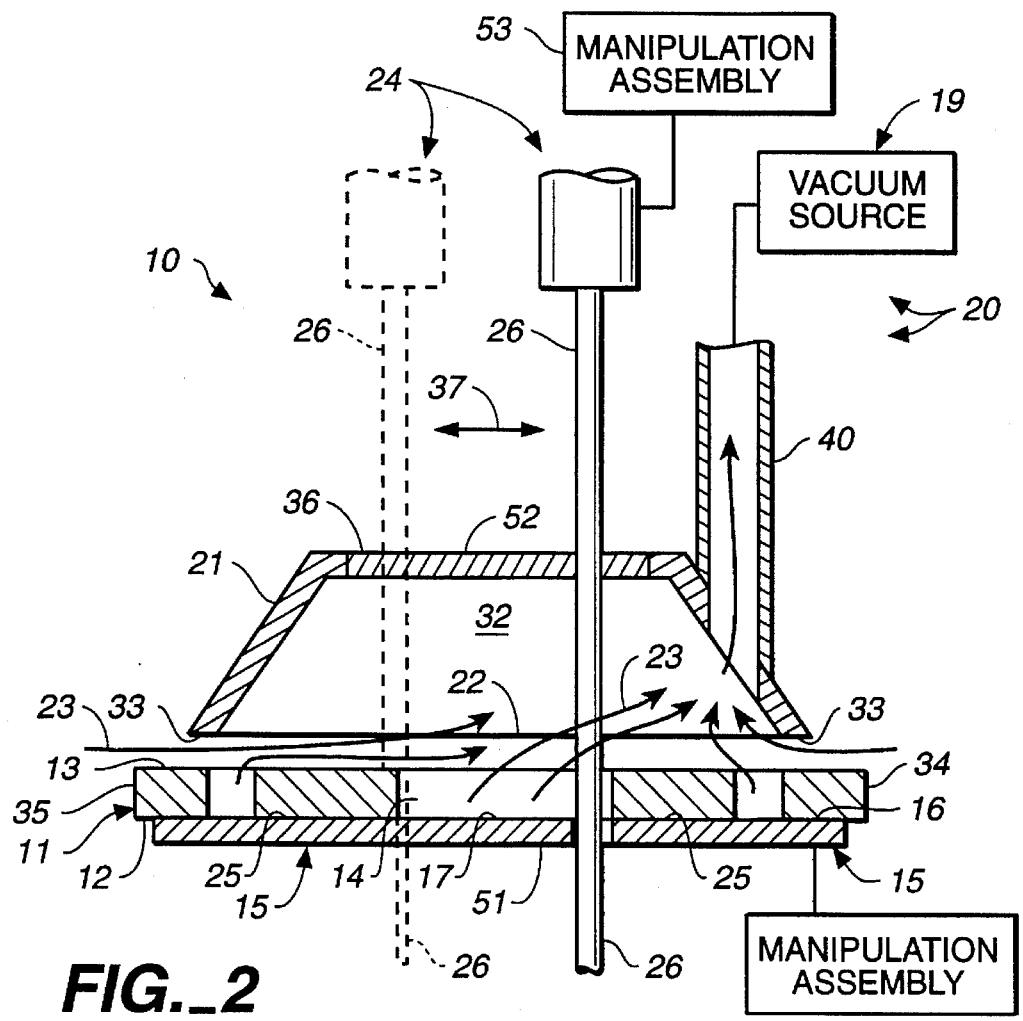
FIG._2

APPARATUS AND METHOD FOR LASER ENGRAVING THIN SHEET-LIKE MATERIALS

TECHNICAL FIELD

The present invention relates, generally, to laser engraving apparatus, and, more particularly, relates to "contact mask" laser engraving apparatus for thin sheet-like materials.

BACKGROUND ART

Recently, laser engraving or cutting of materials such as wood, plastic, paper, or the like has experienced enormous growth and public acceptance. Generally, laser engraving includes the use of a metallic mask perforated with a desired pattern which is placed in contact with a workpiece to be engraved. A powerful carbon dioxide laser beam, properly focused, is scanned or otherwise directed thereupon in an overlapping pattern to uniformly cover the perforations. Impingement of the focused laser upon the exposed material of the workpiece causes combustion or vaporization of the workpiece in areas where the mask perforations are situated. In contrast, where the beam strikes unperforated areas of the mask, the beam is either reflected (preferably) or absorbed, thus preventing engraving of the workpiece other than in the areas of the mask perforations.

This "contact mask" process is advantageous in that the contact between the mask and the workpiece substantially reduces optical aberrations introduced in the transferred image. Further, "reversed, inverted right-reading" issues in the workpiece images are eliminated. Finally, since the entire length of the image-projection beam path is no more than the thickness of the mask, the laser beam quality is unimportant.

While the "contact mask" process has proven satisfactory in many instances, several problems have been found in connection with its use. For example, the hot engraved-material vapor and soot tends to condense upon the outer surface of the mask, darkening it and reducing its reflectivity. A greater amount of beam energy is thus absorbed by the mask causing mask temperatures to elevate. As a result, the higher mask temperatures can leave burn marks on the paper and cause damage to the mask itself.

Further, any gap between the mask and the workpiece can cause vapor condensation therebetween, which often leaves an undesirable residue on the engraved workpiece. This residue is generally very tacky which often causes adherence between the workpiece and the mask. Moreover, if this gap permits mixing of oxygen-bearing air with the engraving vapor close to the workpiece, the vapor may ignite and damage or char the workpiece.

Another problem occurs when the laser engraving beam passes all the way through the workpiece, such as when engraving a sheet of paper. In this situation, the far side of the sheet is exposed to the same problems above-mentioned (i.e., vapor condensation, vapor burning, and ignition of the workpiece).

Attempts to ameliorate the various problems associated with contact-mask laser engraving have been numerous. One approach is to provide an additional mask, or a reflective or absorptive plate in contact with the backside of the engraved sheet. The thin flexible material, such as paper, is sandwiched between the mask and a backing plate, which subsequently, is passed under a laser beam (i.e., scanning). The additional backing, however, increases costs; and more importantly, is subject to the same problems of vapor condensation and overheating as that of the topside plate.

Another approach is to apply firm mechanical clamping between the mask and the workpiece to prevent vapor ignition or deposition on the workpiece surface. Typical of such arrangements are the devices found in U.S. Pat. No. 4,458,133. In this assembly, the mask is made of ferrous material having magnetic properties, while the workpiece, consisting of a sheet or stack of paper, is backed with a plate bearing one or more magnets. The uniform distribution of the magnets assure contact and an even distribution of clamping forces over the mask through the medium of magnetic attraction.

This magnetic configuration, however, is not particularly suitable for automated production. For example, assembly of the mask-paper "sandwich" is labor extensive. The sandwich, further, must be manually placed onto and removed from the conveyor, and the engraved sheets will have to be manually separated from one another after removal from the conveyor. Finally, the clamping force generated by the magnets is fairly limited. Accordingly, this type "contact mask" assembly is generally inappropriate for repetitive volume production.

Other clamping techniques have been employed which have improved the mask-to-workpiece contact. Screw-jacks and heavier masks substantially increase the contact force but are even more labor intensive when assembling the sandwich. Moreover, repetitive heating and cooling of the mask plate eventually causes warpage thereof to prematurely decrease the mask's lifespan.

More complex solutions involve positioning the mask remotely from and out of contact with the workpiece. This approach eliminates accumulation of condensed vapor or soot upon the mask, and avoids any mask-to-workpiece contact which may damage the workpiece. Single sheet workpieces, rather than multi-level sandwiches, can also be handled by this approach which is more suitable for automated manufacture. Lastly, the mask can be constantly cooled (via fans, blowers or the like) without mechanical interference with the engraving process. Examples of these laser engraving apparatus incorporating "non-contact mask" processes are disclosed in U.S. Pat. Nos. 4,156,124; 4,430, 548; and 4,480,169.

While non-contact mask engraving has overcome some of the aforementioned problems, several new problems are introduced. For instance, one or more optical elements must be interposed between the workpiece and the mask to focus and more accurately control the laser beam path. This, of course, substantially increases the apparatus cost, as well as the cost of maintenance of such assemblies, which require constant recalibration. Each expensive optical element must be accurately positioned and aligned, and each is itself subject to damage from the accumulation of condensed engraving vapor and overheat caused thereby through reduced reflectivity. Further, the image engraved upon the paper becomes a distant projection of the mask image, introducing optical effects such as diffraction and depth-of-focus to the potential degradation of the engraved image.

Further still, while the mask has been removed from the effects of the engraving process, the surface of the workpiece itself is no longer protected by the mask from the condensation of engraving vapor nor from the sooting or ignition resultant from the burning of engraving vapor in close proximity thereto. Consequently, to protect the exposed workpiece sheet, the non-contact mask process requires the installation of a complex assembly of blowers, ducts and other exhaust extraction equipment for removing by-products.

DISCLOSURE OF INVENTION

Accordingly, it is an object of the present invention to provide a new and improved apparatus and method for the laser cutting or engraving of thin, flexible, or smoke-sensitive sheets of material such as paper, cardboard, cloth, plastic, metal, or wood veneer.

It is another object of the present invention to provide a laser engraving apparatus and method which maintains firm contact between a mask and a workpiece during laser engraving.

Another object of the present invention is to provide a laser engraving apparatus and method for single sheet engraving which is suitable for automated manufacture.

Still another object of the present invention is to provide a laser engraving apparatus and method which cools the mask.

Yet another object of the present invention is to provide a laser engraving apparatus and method which removes vaporous by-products from the engraving surface to reduce condensation on the mask.

It is a further object of the present invention to provide a laser engraving apparatus and method which is durable, compact, easy to maintain, has a minimum number of components, and is easy to use by relatively unskilled personnel.

In accordance with the foregoing objects, the present invention includes a laser engraving apparatus for engraving sheet-like material which is comprised of a mask having a mounting surface and an opposite cutting surface, and at least one image opening extending therethrough from the cutting surface to the mounting surface. A relatively thin sheet-like material to be engraved is positioned proximate to and adjacent the mask mounting surface, and extends over the image opening. The present engraving apparatus further includes a vacuum assembly having a suction housing with a mouth portion formed for drawing air therethrough. The mouth portion is positioned proximate the cutting surface of the mask and is sufficiently close to the opening to hold the material to be engraved in abutting contact against the mask. A laser cutting assembly generates a laser beam which impinges on workpiece exposed through the mask causing combustion or vaporization of a portion thereof. The vacuum assembly also automatically draws away vaporization by-products from a vaporization or engraving surface through the vacuum mouth. The unexposed portions of the vaporization surface remain unaffected by the laser beam and the vaporization by-products.

A method of the present invention for engraving a workpiece with a laser assembly is comprised, briefly, of the steps of: drawing air through a mouth portion of a suction housing positioned proximate the cutting surface to hold an engravable workpiece and an engraving mask together in abutting contact by using a partial vacuum; and engraving an exposed portion of the workpiece by passing a laser beam through an image opening in said mask. Additionally, the present method preferably includes the step of removing vaporization by-products generated by vaporization of a portion of the workpiece by using the partial vacuum to draw such vaporization by-products away from said workpiece.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIG. 1 is a top perspective view of a laser engraving apparatus constructed in accordance with the present invention and showing a vacuum assembly used to effect contact mask engraving.

FIG. 2 is a fragmentary, enlarged, front elevation view, in cross-section, of the laser engraving apparatus of the present invention taken substantially along the plane of line 2—2 in FIG. 1.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

The present invention provides a laser engraving apparatus employing a "contact mask" process which eliminates many of the problems associated with the prior art assemblies. FIGS. 1 and 2 illustrate the present contact mask laser engraving apparatus, generally designated 10, which is illustrated engraving an engravable workpiece. Laser engraving apparatus 10 includes a mask, generally designated 11, having a work-engaging surface 12 and an opposite facing cutting surface 13. Further, at least one image opening 14 extends through the mask from cutting surface 13 to work-engaging surface 12. A workpiece 15, which preferably is a relatively thin sheet of material having a vaporization or engraving surface 16, which is positioned proximate to mask surface 12. This engravable material 15 extends over image opening 14 to expose a portion 17 thereof through opening 14 for engraving.

In order to hold mask 11 and workpiece 15 firmly together for engraving, the present apparatus further includes a vacuum assembly 20 having a source and a partial vacuum 19 coupled to a suction housing, generally designated 21, which is formed with a mouth portion 22 for drawing air in the direction of arrows 23 upon creation of a partial vacuum in the vacuum assembly. Mouth 22 is positioned sufficiently close to one of the mask and workpiece and to hold workpiece 15 and mask 11 in abutting contact. In the preferred form, mouth 22 is positioned closely proximate mask surface 13 and draws air across or through mask 11 to pull the workpiece into abutting contact with workpiece-engaging surface 12 in order to hold the mask and workpiece in contact with each other. A laser cutting assembly, generally designated 24, generates a laser beam 26 which may be directed onto exposed portion 17 of vaporization or engravable surface 16, causing vaporization thereof. The unexposed portions 25 of surface 16 remain unaffected by laser beam 26.

Vacuum assembly 20 provides a sufficient partial vacuum in housing 21 to draw either the workpiece into contact with the mask, or in a reversal of parts, the mask into contact with the workpiece. In the preferred form the partial vacuum is applied across the mask, for example, through image opening 14, and pulls the workpiece, which preferably is an imperforate sheet of material such as paper, against the mask. It will be understood, however, that the partial vacuum could be applied from side 51 of workpiece 15 through openings (not shown) in the workpiece or around the edges of the workpiece, to draw the mask against the workpiece.

In the preferred form contact between the workpiece and mask is uniformly achieved at edge portions 30 defining image opening 14 by drawing through opening 14, and a more precise engraving cut or burn of the material through opening 14 is accomplished without adversely affecting unexposed workpiece portions 25. This precision is maintained even should the mask warp, a substantial concern with the prior art, since the flexible workpieces, such as paper sheets, will be drawn against and conform to mask 15 at image opening 14. The novel engraving assembly of the present invention, therefore, eliminates the need for backing plates and clamps to maintain the workpiece in constant contact with the mask.

Importantly, in the present apparatus and method, vacuum assembly 20 further causes the engraving vaporization by-products, such as condensed paper vapor or micro paper-dust, to be drawn away from the burn area of the workpiece as laser beam 26 impinges upon the exposed portion for vaporization. The partial vacuum or low pressure zone in housing 21 tends to reduce condensation of the vaporized by-products on both the workpiece and on the mask. Further, vacuum assembly 20 has a third function, namely, cooling of mask 11. Air movement (represented by arrows 23) induces convection heat transfer from the mask of heat produced by the beam impinging on the mask 11 upon passage of air over cutting surface 13 and into housing mouth portion 22. Charring, singeing or sooting of the workpiece, caused by an over-heated mask, can thus be substantially reduced.

In the preferred embodiment of the present invention, mask 11 is generally rectangular-shaped having substantially planar workpiece-engaging surface 12 and cutting surfaces 13. Thus, the planar mounting surface allows flexible sheet workpieces 15 to be easily maintained in contact thereagainst, as best viewed in FIG. 2. Image openings 14 may be positioned longitudinally along a central portion of mask 11 (as outlined between dotted lines/arrows 31 in FIG. 1). The unexposed portions 25 of workpiece 15, therefore, include an adequate surface area to seat firmly against mask upon suction of vacuum assembly 20. This adequate backing and support of the flexible material promotes precision vaporization of the image or exposed portions 17, while accurately shielding unexposed portions 25, when the workpiece is subjected to laser beam 26.

Suction housing 21 includes an evacuated chamber 32 (FIG. 2) and terminates in a bottom edge 33 of housing 21 which forms mouth portion 22. As can be seen, mouth 22 preferably extends transversely across mask 11 and over the central portion thereof from proximate one side 34 to proximate an opposite side 35 of the workpiece. Further, by reducing the cross-sectional area of mouth portion 22, the suction generated by the source of portion vacuum 19 can be more easily concentrated and directed toward a particular image opening 14 to draw the exposed portion of the workpiece into firm contact with mask 11, rather than acting on the mask as a whole. Mouth portion 22 is generally elongated and extends transversely across mask 11 so as to require relative movement between suction housing 21 and mask 11 in the directions of arrows 31 to pass over all the image openings. Thus, only the geographically local areas surrounding the region being vaporized need to be drawn firmly against work-engaging surface 12 at opening 14 as the elongated mouth portion passes thereover.

Suction housing 21 preferably includes an elongated laser-transmissive channel or slot 36 extending into chamber 32 which is positioned longitudinally along the direction of elongated mouth portion 22. Channel 36 is preferably positioned atop housing 21 between laser cutting assembly 24 and housing mouth portion 22 and is laser transmissive so that laser beam 26 can pass through laser channel 36, cavity or chamber 32 and mouth 22 and onto the exposed portions of the workpiece. Accordingly, laser cutting assembly 24 may be positioned outside housing 21 (FIG. 2) and laser beam 26 directed through laser channel 36 and mouth portion 22 to the workpiece. A slot or opening can be used as channel 36, which will have maximum laser transmissivity, or channel 36 can have a laser transparent window 52 of gallium arsenide or zinc selenide is preferably inset in laser channel 36 so that air proximate channel 36 is not drawn into chamber 32 through laser channel 36 by vacuum assembly 20.

In the preferred embodiment, laser beam 26 is a more intensely focused beam which is too narrow to span the whole channel 36. Therefore, laser beam 26 must be scanned or otherwise directed through elongated channel 36 in an overlapping and reciprocating pattern (as represented in phantom lines in FIG. 2 and arrows 37) to contact all portions of the exposed vaporization surface 16. Accordingly, to fully scan the exposed surfaces, the laser beam and/or exposed workpiece usually will be moved both laterally relative to channel 36, and longitudinally along mask 11. Laser assembly 24, therefore, includes a manipulation assembly 53 which coordinates the cutting movement of laser 24. Additionally, a second manipulation assembly 54 may be used to move mask 11 and workpiece 15 as a unit. Mask 11 and workpiece 15 can be moved, for example, by providing assembly 54 as a track and carriage mechanism (not shown) formed for movement in the directions of arrows 31 while vacuum housing 21 is retained in a stationary position. Therefore, laser manipulating assembly 53 only need move laser beam 26 transversely and reciprocally along slot 36. It will be understood, of course, that other combinations of movement patterns between the mask/workpiece, vacuum housing and the laser assembly may be used in the apparatus of the present invention.

Vacuum assembly 20 can include a standard source of partial vacuum 19 communicating with chamber 32 through conduit or tubing 40. All the air drawn through chamber 32 must thus pass through tubing 40, which could be connected at a plurality of positions along housing 21 to communicate a low pressure to chamber 32. Preferably, vacuum source 19 is provided by a motor-driven rotary (or centrifugal) blower generating a partial vacuum of about 2–15 inches of water. This amount of suction is sufficient to draw air radially around edge 33 of housing 21 while still generating enough suction to regionally firmly hold a flexible workpiece 15 against workpiece-engaging surface 12 proximate image opening 14. However, the amount of partial vacuum necessary is dependent on the distance between the mask cutting surface 13 and the housing edge 33, and the physical properties of the workpiece. Depending on the amount of suction applied, this spacing preferably varies between about ⅛ to about ¾ inch.

Since the suction housing is preferably designed to move relative the mask and over image openings 14, the firm adhesion of the exposed portions of the workpiece to the mask occur primarily at regions proximate the suction housing mouth portion. Hence, other forms of adhesion may be applied between the mask and the workpiece about a perimeter of the workpiece to loosely hold the assembly together. This assures that the workpiece will not pull away or separate from the mask surface 12, due to gravitational forces, when the housing mouth portion passes over portions of the mask which are void of any image openings.

For example, in an alternative embodiment of the present invention, a plurality of adhesion apertures 41 are disposed longitudinally along mask 11 on opposite sides of the mask central portion. Each aperture 41 is sufficiently spaced-apart from image opening 14 to be out of contact with laser beam 26 so that the exposed portions 42 of the workpiece beneath apertures 41 will not be engraved or vaporized by laser beam 26. Each adhesion aperture 41, however, will be disposed under or sufficiently close to housing mouth portion 22 so that when housing 21 passes thereover, the workpiece will be drawn into abutting contact with mask workpiece-engaging surface 12 proximate the corresponding adhesion aperture. Hence, adhesion apertures 41 further facilitate-adhesion of workpiece 15 to mask 11 which is especially helpful during passage of mouth portion 22 over mask 11 when no image openings 14 are present.

In some instances, however, the sheets may be too heavy to be transported with the mask by the exhaust vacuum applied through adhesive apertures 41 and image openings 14. In this situation, suction ports (not shown) positioned peripherally around mask 11 may be provided which are coupled to a separate and greater vacuum source for additional adhesion. Another approach may be to provide automated finger-clamps or roller wheels (not shown) which sandwich the sheet against mask 11 from below.

In the preferred form, workpiece 15 is a paper-based product such as paper sheets, cardboard or the like. It will be understood, however, that thicker plastic sheets or wood may be cut or engraved as well without departing from the true spirit and nature of the present invention. It will further be appreciated that should it be undesirable to provide non-image mask openings in the area upon which the laser beam is normally scanned, or should it be desirable to select from a multiplicity of mask image openings 14, the laser beam may be simply turned off, decreased in power, or redirected during the time that such non-image openings pass through the scanning area. Therefore, one image opening 14 may be selected for engraving upon the workpiece below, while another mask opening 14 may be bypassed.

Further, while the present invention has primarily been described as providing a laser assembly capable of penetrating all the way through the workpiece, it will be appreciated that the laser assembly may only partially through the workpiece (i.e., engraving). This is especially true in woodwork or heavy papers, particularly those consisting of multiple layers. For instance, the top lamination or heavy printing may be vaporized away to expose an inner surface of contrasting color or texture.

From the description of the present apparatus, it will be understood that the method for laser engraving a workpiece of the present invention is comprising the steps of: holding an engravable member or workpiece 15 and a mask 11 together in abutting contact by using a partial vacuum; and engraving an exposed portion 17 of a surface 16 of the workpiece through an image opening 14 in mask 11 while the workpiece and mask are held together by the partial vacuum. Additionally, in the present method the partial vacuum is used to remove vaporization by-products generated by vaporization or combustion of surface 16. Moreover, the partial vacuum can be used to effect cooling of mask 11 by pulling air in over the mask.

What is claimed is:

1. A laser engraving apparatus comprising:

a mask having a body masking the passage of a laser beam and having an image opening in said body;

a vacuum assembly formed to create a partial vacuum and having a housing positioned to apply sufficient partial vacuum to at least one of said mask and a workpiece to be engraved to hold said mask and workpiece together in tight abutting contact; and a laser cutting assembly formed to generate a laser beam and positioned to direct said laser beam onto said mask and said workpiece at least partially through said image opening in said mask to effect engraving of said workpiece while said vacuum assembly holds said mask and said workpiece together and said mask effects masking of portions of said workpiece.

2. The engraving apparatus as defined in claim 1 wherein, said vacuum assembly is positioned proximate a side of said mask opposite said workpiece to hold said workpiece to said mask by applying said partial vacuum across said mask to said workpiece.

3. The engraving apparatus as defined in claim 2 wherein, said mask further includes a plurality of adhesion apertures through said mask for holding said workpiece into contact with said mask.

4. The engraving apparatus as defined in claim 3 wherein, said adhesion apertures are sufficiently spaced-apart from said image opening to be out of alignment with said laser beam.

5. The engraving apparatus as defined in claim 1 wherein, said vacuum assembly includes a housing having an edge positioned relative to said mask to define at least one intake opening therebetween to induce convection heat transfer of heat from said mask upon passage of air drawn into said housing by said vacuum assembly.

6. The engraving apparatus as defined in claim 5 wherein, said edge is spaced from said mask by between about ⅛ to about ¾ inches.

7. The engraving apparatus as defined in claim 1, and a workpiece provided by a sheet of engravable material positioned on a side of said mask opposite said vacuum assembly.

8. The engraving apparatus as defined in claim 7 wherein, said laser assembly is formed to generate a said laser beam with sufficient energy to cut through said workpiece.

9. The engraving apparatus as defined in claim 7 wherein, said sheet of engravable material is a sheet of paper-based material.

10. A method of laser engraving comprising the steps of:

holding an engravable member and an engraving mask together with edges of said mask defining an image opening in abutting contact with said engravable member using a partial vacuum; and engraving said engravable member by passing a laser beam through an image opening in said mask while said engravable member and said mask are held together by said partial vacuum.

11. The method as defined in claim 10 wherein, said holding step is accomplished by positioning said vacuum assembly on a side of said mask opposite said engravable member, and said partial vacuum is applied across said mask to said engravable member.

12. The method as defined in claim 11 wherein, said partial vacuum is applied to said engravable member through an opening in said mask.

13. The method according to claim 10 further including the step of:

cooling said mask by causing air drawn in by said partial vacuum to pass over said mask.

14. The method according to claim 10, and the step of:

removing vaporization by-products generated by vaporization of a portion of said engravable member during said engraving step by using said partial vacuum to pull said vaporization by-products away from said engravable member from the same side said engravable member as said laser beam impinges on said engravable member.

15. The method of engraving a sheet of material with a laser assembly comprising the steps of:

providing a mask having a sheet-facing surface and an opposite laser-facing cutting surface and including at least one image opening permitting passage of a laser beam therethrough from said laser-facing cutting surface to said sheet-facing surface;

positioning a relatively thin sheet of engravable material proximate to and adjacent said sheet-facing surface of said mask with a portion of said sheet of engravable material aligned with said one image opening;

drawing air through a mouth portion of a suction housing positioned proximate said laser-facing cutting surface to adhere said sheet of engravable material in abutting contact against said sheet-facing surface in a manner exposing said portion of said sheet of engravable material through said image opening;

vaporizing the exposed portion of said sheet of engravable material through exposure to a laser beam through said image opening while portions of said sheet of engravable material behind said mask remain unaffected by said laser beam; and removing vaporization by-products generated by vaporization of said sheet of engravable material during said step of drawing air.

16. The method according to claim 15 wherein, said drawing air step is accomplished by moving one of said suction housing and said mask relative to the other longitudinally along said mask from proximate a front portion thereof to proximate a rear portion thereof over said mask image opening.

17. The method according to claim 16 wherein, said mouth portion is elongated and extends transverse to said mask from proximate one side thereof to an opposite second side thereof.

18. The method according to claim 15 wherein, said housing has an elongated channel therethrough extending transverse to said mask; and said vaporizing step is further accomplished by scanning said laser beam along the direction of said elongated channel in a sweeping motion as said mouth portion moves relatively longitudinally along said mask and over said image opening.

19. The method according to claim 15 and the additional step of:

cooling said mask by providing drawing air over said mask with an edge of said housing mouth portion opposing and spaced-apart from said mask.

20. A laser engraving apparatus comprising:

a mask having an image opening therethrough;

a vacuum assembly formed to create a partial vacuum and having a housing positioned to apply sufficient partial vacuum to at least one of said mask on a workpiece to be engraved to hold said mask and workpiece together in tight abutting contact;

a laser cutting assembly formed to generate a laser beam and positioned to direct said laser beam onto said workpiece through said image opening to effect engraving of said workpiece while said vacuum assembly holds said mask and said workpiece together; and said housing further having a channel formed therein aligned with said image opening for passage of said laser beam through said channel and onto said workpiece, said channel being elongated and extending transverse to said mask by a sufficient amount to permit said laser assembly to scan laser beam onto exposed portions of said workpiece through said image opening.

21. A laser engraving apparatus comprising:

a mask having an image opening therethrough;

a vacuum assembly formed to create a partial vacuum and having a housing positioned to apply sufficient partial vacuum to at least one of said mask on a workpiece to be engraved to hold said mask and workpiece together in tight abutting contact;

a laser cutting assembly formed to generate a laser beam and positioned to direct said laser beam onto said workpiece through said image opening to effect engraving of said workpiece while said vacuum assembly holds said mask and said workpiece together; and one of said vacuum assembly and said mask is mounted for movement relative to the other in a direction along said image opening.

* * * * *